(12) United States Patent
Winters

(10) Patent No.: US 10,422,412 B2
(45) Date of Patent: Sep. 24, 2019

(54) DRIVE UNIT AND COMBINATION OF A DRIVE UNIT WITH A UNIT TO BE DRIVEN

(71) Applicant: EHRT Maschinenbau GmbH, Rheinbreitbach (DE)

(72) Inventor: Andreas Winters, Solingen (DE)

(73) Assignee: EHRT Maschinenbau GmbH, Rheinbreitback (DE)

( * ) Notice: Subject to any disclaimer, the term of this patent is extended or adjusted under 35 U.S.C. 154(b) by 343 days.

(21) Appl. No.: 15/246,075

(22) Filed: Aug. 24, 2016

(65) Prior Publication Data

US 2017/0059000 A1  Mar. 2, 2017

(30) Foreign Application Priority Data

Aug. 25, 2015 (DE) .................. 10 2015 010 878
Feb. 23, 2016 (DE) .................. 10 2016 002 055

(51) Int. Cl.
| | |
|---|---|
| *F16H 1/28* | (2006.01) |
| *F16H 57/02* | (2012.01) |
| *H02K 7/116* | (2006.01) |
| *G05B 19/19* | (2006.01) |
| *G05B 23/02* | (2006.01) |
| *H02K 7/08* | (2006.01) |

(52) U.S. Cl.
CPC .............. *F16H 1/28* (2013.01); *F16H 57/02* (2013.01); *G05B 19/19* (2013.01); *G05B 23/0208* (2013.01); *H02K 7/083* (2013.01); *H02K 7/116* (2013.01); *F16H 2057/02034* (2013.01)

(58) Field of Classification Search
CPC .................................................. B60K 7/0007
See application file for complete search history.

(56) References Cited

U.S. PATENT DOCUMENTS

| | | | |
|---|---|---|---|
| 8,834,311 B1 | 9/2014 | Kurowsky et al. | |
| 9,254,741 B2* | 2/2016 | Park | B60K 7/0007 |
| 2013/0037331 A1* | 2/2013 | Smetana | B62D 7/04 |
| | | | 180/6.2 |

FOREIGN PATENT DOCUMENTS

| | | |
|---|---|---|
| DE | 2005047 | 8/1971 |
| DE | 3032587 | 4/1982 |
| DE | 102006028803 | 12/2007 |
| DE | 102009016854 | 10/2010 |
| DE | 102012210242 | 12/2013 |
| DE | 102013226804 | 6/2015 |
| EP | 1719656 | 11/2006 |
| WO | 2008131358 | 10/2008 |

\* cited by examiner

*Primary Examiner* — Derek D Knight
(74) *Attorney, Agent, or Firm* — Mark David Torche; Patwrite Law

(57) ABSTRACT

A drive unit with an electric motor and a speed-transforming transmission connected in a rotationally driven manner to a power take-off shaft of the electric motor, in which the electric motor comprises a stator and a rotor comprising the power take-off shaft, is characterized in that the speed-transforming transmission is arranged inside the power take-off shaft constituted as a hollow shaft.

7 Claims, 1 Drawing Sheet

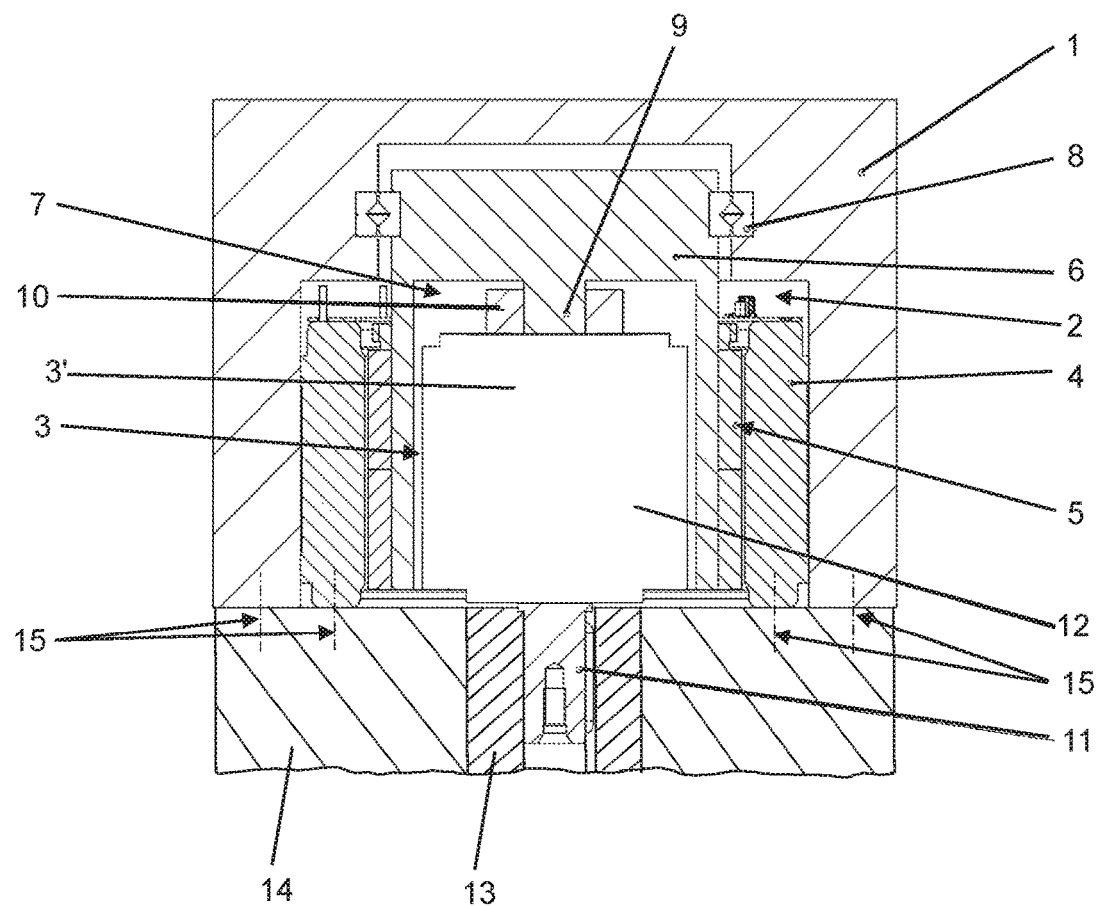

DRIVE UNIT AND COMBINATION OF A DRIVE UNIT WITH A UNIT TO BE DRIVEN

CROSS REFERENCE TO RELATED APPLICATIONS

This application claims priority under the Paris Convention on DE Patent Application Number 1020160020555 filed on Feb. 23, 2016 and DE Patent Number 1020150108786 filed on Aug. 25, 2015, the entire content of each are herein incorporated by reference

FIELD OF THE INVENTION OF THE INVENTION

The invention relates to a drive unit with an electric motor and a speed-transforming transmission connected in a rotationally driven manner to a power take off-shaft of the electric motor. The invention relates further to a combination of such a drive unit with a unit to be driven.

BACKGROUND OF THE INVENTION

Conventional arrangements of such drive units provide that the speed-transforming transmission is connected at the front end of the electric motor to a portion of the power take-off shaft of the electric motor projecting from a housing of the electric motor. This results in a relatively large overall size for the drive unit, especially in the direction along the rotational axis of the electric motor (overall length), which is disadvantageous for many applications.

Starting from this prior art, the invention was based upon the object of specifying a drive unit with an electric motor and a speed-transforming transmission, which is characterized by the most compact possible overall size and especially overall length.

This object is achieved according to the invention by a drive unit according to claim 1. A combination of such a drive unit with a unit to be driven forms the subject matter of claim 7. Advantageous embodiments of the drive unit according to the invention and of the combination according to the invention of drive unit and unit to be driven form subject matters of the other claims and are derived from the following description of the invention.

In the case of a drive unit with an electric motor and a speed-transforming transmission connected in a rotationally driven manner to a power take-off shaft of the electric motor, in which the electric motor comprises a stator and a rotor comprising the power take-off shaft, it is provided according to the invention that the speed-transforming transmission is arranged (at least partially) inside the power take-off shaft constituted (in at least one portion) as a hollow shaft. In this context, the rotor can be arranged both (at least partially) inside (so-called internal rotor) and also outside (so-called external rotor) the stator. Through the at least partial arrangement of the speed-transforming transmission inside the electric motor, which is allowed by the embodiment of the power take-off shaft as a hollow shaft, a compact overall size and especially overall length for the drive unit according to the invention can be realized.

Alongside such a drive unit, a combination according to the invention comprises at least one unit to be driven, which comprises a static part and a rotatable part, wherein the rotatable part is provided for a rotationally driven connection with an output component, especially an output shaft, of the speed-transforming transmission.

By preference, it can be provided that the speed-transforming transmission is constituted in the form of a transmission unit which, alongside the transmission components (for example, wheels) guaranteeing the speed-transformation, also comprises at least one transmission housing (which can itself represent one of the transmission components) surrounding individual components or all of the transmission components. By particular preference, it can be further provided, here, that the transmission unit is embodied in an encapsulated manner, so that the latter completely surrounds all transmission components and comprises as far as possible only (preferably sealable) passage openings for an input shaft and an output shaft or for components (especially the power take-off shaft of the electric motor and a drive shaft of the rotatable part of the unit to be driven) provided for the rotationally rigid connection to the input shaft and the output shaft. Optionally, further, preferably sealable, maintenance openings can be provided, for example, for the lubrication of the transmission components with a lubricant.

In one preferred embodiment of the drive unit according to the invention and therefore also of the combination according to the invention, it can be provided that the electric motor is constituted as a servomotor. The electric motor is accordingly constituted in such a manner that, through the integration of at least one sensor and the evaluability of the measured values of this sensor in an evaluation unit, it allows a control at least of the angular position of the power take-off shaft and, derived from this, preferably also of the rotational speed and/or the angular acceleration. In this context, by further preference, a control for the angular position and/or one or more parameters derived from the angular position can be provided.

By further preference, it can be provided that the speed-transforming transmission is constituted as a planetary gear or at least comprises a planetary gear. In particular, planetary gears can comprise the advantage of a compact overall form at the same time as large speed-transforming ratios.

A combination according to the invention of the unit to be driven and such a drive unit with planetary gear can be advantageously further developed in that at least one transmission component of the planetary gear is connected in a rotationally rigid manner to the static part of the unit to be driven. In this manner, the possibility of the planetary gear being rotated together with the power take-off shaft of the electric motor can be avoided.

In one preferred embodiment of the drive unit according to the invention, a drive housing (at least partially) accommodating the electric motor and the speed transforming transmission can be further provided. In particular, this can be provided for the rotationally rigid attachment of the stator of the electric motor and/or for the attachment of the entire drive unit to its attachment structure, for example, to the static part of the unit to be driven. In one preferred embodiment of the combination according to the invention, it can therefore be provided that the drive housing of the drive unit is connected in a rotationally rigid manner to the static part of the unit to be driven. Additionally or alternatively, it can also be provided that the stator of the electric motor is connected in a rotationally rigid manner to the static part of the unit to be driven.

By further preference, it can be provided with such a drive unit that the power take-off shaft extends beyond the stator with a bearing portion, at least at one longitudinal-axial end, and is mounted in a rotatable manner in this bearing portion, inside the drive housing, thereby achieving a design advantage in the bearing for the rotor of the electric motor.

The indefinite articles ("a" and "an") should be understood as such and not as numerals, especially in the claims and in the description explaining the claims in general. Correspondingly specified components should therefore be understood in the sense that these are present at least once and can be present multiple times.

SUMMARY OF THE INVENTION

A drive unit with an electric motor and a speed-transforming transmission connected in a rotationally driven manner to a power take-off shaft of the electric motor, in which the electric motor comprises a stator and a rotor comprising the power take-off shaft, is characterized in that the speed-transforming transmission is arranged inside the power take-off shaft constituted as a hollow shaft.

BRIEF DESCRIPTION OF THE DRAWINGS

The invention is explained in greater detail on the basis of an exemplary embodiment presented in the drawings. The drawings show:

FIG. 1: in a simplified view, a combination according to the invention of a drive unit according to the invention and a unit to be driven.

DETAILED DESCRIPTION OF THE INVENTION

The drive unit of the combination according to the invention illustrated in FIG. 1 comprises a drive housing 1, which constitutes a retaining recess 2 open towards a front end, which is provided for the largely complete accommodation of both an electric motor and also a transmission unit 3 of the drive unit.

The electric motor is constituted as a servomotor and comprises a stator 4 which can be connected in a rotationally rigid manner, for example, via one or more screw connections or threaded connections to the drive housing 1, and a rotor 5 arranged in a rotatable manner inside the stator 4, which comprises a power take-off shaft 6 which is constituted in one portion as a hollow shaft. The internal volume 7 of this portion of the power take-off shaft 6 extends, here, up to the front end of the power take-off shaft 6 at which the drive housing 1 is also constituted to be open. At the other end of the power take-off shaft 6, the latter projects with a bearing portion beyond the stator 4 of the electric motor and into a first portion of the retaining recess 2 of the drive housing 1, which comprises a smaller diameter by comparison with a second portion, inside of which, inter alia, the stator 4 of the electric motor is arranged. In this first portion of the retaining recess 2, the corresponding bearing portion of the power take-off shaft 6 is mounted in a rotatable manner via a rotary bearing 8.

A power take-off journal 9 projecting centrally from the base of the internal volume 7 of the output shaft serves for a rotationally rigid connection with an input shaft 10 of the transmission unit 3, which is arranged completely inside the power take-off shaft 6 of the electric motor, with the exception of one portion of an output shaft 11 of the transmission unit 3. In the present exemplary embodiment, the transmission unit 3 is constituted as a planetary gear unit 3'.

The transmission unit 3 comprises a transmission housing 12, inside of which transmission components (partially not illustrated) of a single or multiple planetary gear and accordingly, inter alia, one or more rotating wheels and one or more orbited wheels are arranged in encapsulated embodiment. In this context, an embodiment of the planetary gear with one or more combinations of sun wheel, planetary wheel or wheels, and hollow wheel can be advantageous with regard to a desired compact overall size and especially overall length. In particular, the wheels of the planetary gear can, cooperate in a form-fit manner and can especially be constituted as cog wheels. The transmission housing 12 can therefore itself constitute a transmission component and, for example, serve as a hollow wheel for the planetary gear.

The portion of the output shaft 11 of the transmission unit 3 projecting from the power take-off shaft 6 of the electric motor and also from the drive housing 1 serves for a rotationally rigid connection with a rotatable part 13 of the unit to be driven, illustrated in an extremely simplified manner, which comprises another static part 14 alongside this rotatable part 13. The unit to be driven can be, for example, a tool unit, in which the tool to be driven represents the part to be driven or is connected to the latter in a rotationally driven manner. The static part 14 in such a tool unit can be constituted, in particular, by a tool housing, which can serve primarily for an at least rotatable bearing of the tool.

In order to support the rotary moment generated by the electric motor and to guarantee the desired speed-transformation by the transmission unit 3, it can be provided that both the drive housing 1 and also the transmission housing 12 are connected in a rotationally rigid manner to the static part 14 of the unit to be driven. For example, screw

LIST OF REFERENCE NUMBERS

1 Drive housing
2 Retaining recess
3 Transmission unit
4 Stator
5 Rotor
6 Power take-off shaft
7 Internal volume of the power take-off shaft
8 Rotary bearing
9 Power take-off journal
10 Input shaft of the transmission unit
11 Output shaft of the transmission unit
12 Transmission housing
13 Rotatable part of the unit to be driven
14 Static part of the unit to be driven
15 Screw connection

What is claimed is:

1. A drive unit with an electric motor and a speed-transforming transmission connected in a rotationally driven manner to a power take-off shaft of the electric motor, wherein the electric motor comprises a stator and a rotor comprising the power take-off shaft, characterized in that the speed-transforming transmission is arranged inside the power take-off shaft constituted as a hollow shaft;
   wherein the speed-transforming transmission is arranged inside a transmission housing of a transmission unit;
   characterized by a drive housing retaining the electric motor and the speed-transforming transmission.

2. The drive unit according to claim 1, characterized in that the electric motor is constituted as a servomotor.

3. The drive unit according to claim 1, characterized in that the speed-transforming, transmission forms a planetary gear.

4. The drive unit according to claim 3, characterized in that the stator of the electric motor is connected in a rotationally rigid manner to the static part of the unit to be driven.

5. The drive unit according to claim 3, wherein the drive housing is connected in a rotationally rigid manner to the static part of the unit to be driven.

6. The drive unit according to claim 1, characterized in that the power take-off shaft extends at least at one longitudinal-axial end beyond the stator with a bearing portion and is mounted in this bearing portion in a rotatable manner within the drive housing.

7. The drive unit according to claim 1, further comprises a unit to be driven, which comprises a static part and a rotatable part.

* * * * *

UNITED STATES PATENT AND TRADEMARK OFFICE
CERTIFICATE OF CORRECTION

PATENT NO. : 10,422,412 B2  
APPLICATION NO. : 15/246075  
DATED : September 24, 2019  
INVENTOR(S) : Andreas Winters Page 1 of 1

It is certified that error appears in the above-identified patent and that said Letters Patent is hereby corrected as shown below:

On the Title Page

Item (73) The city In the Assignee reads:
"Rheinbreitback"
Should read:
--Rheinbreitbach--

Signed and Sealed this  
Twenty-fourth Day of March, 2020

Andrei Iancu  
*Director of the United States Patent and Trademark Office*